United States Patent [19]

Scott et al.

[11] 4,256,714

[45] Mar. 17, 1981

[54] BASIC ALUMINUM NITRATE CRYSTALLIZATION

[75] Inventors: Charles E. Scott; John L. Dewey, both of Little Rock, Ark.

[73] Assignee: Reynolds Metals Company, Richmond, Va.

[21] Appl. No.: 61,296

[22] Filed: Jul. 27, 1979

[51] Int. Cl.$^3$ .............................................. C01F 7/66
[52] U.S. Cl. .................................. 423/295; 23/305 A
[58] Field of Search .............. 423/395, 125; 23/305 A

[56] References Cited

U.S. PATENT DOCUMENTS

| | | | |
|---|---|---|---|
| 1,713,754 | 4/1922 | Mejdell | 423/626 |
| 2,127,504 | 8/1938 | Derr et al. | 423/125 |
| 3,208,834 | 9/1965 | Schulze | 23/302 |
| 3,957,947 | 5/1976 | Yamada et al. | 423/395 X |

*Primary Examiner*—G. O. Peters
*Attorney, Agent, or Firm*—Glenn, Lyne, Girard and McDonald

[57] ABSTRACT

There is described a process for preparing large crystals of basic aluminum nitrate (BAN) from a nitric acid feed solution containing $Al_2O_3$ values comprising the steps of:

(1) evaporating water and nitric acid from the solution in a single step evaporation performed at a temperature of between about 270° and about 450° F. and at a pressure of between about atmospheric and about 60 psig to produce an evaporated liquor comprising at least about 16% alumina by weight;

(2) holding the evaporated liquor in a quiescent state for a period of between about 20 minutes and about two hours within the temperature range of about 270° F. to about 340° F.;

(3) injecting water into the product of step 2, the water being added in an amount sufficient to adjust the composition of the conditioned liquor to a composition expressible as the sum of two components
  (1) ANN ($Al_2O_3.6HNO_3.15H_2O$ or $Al(NO_3)_3.9H_2O$), and
  (2) The desired crystal product BAN or Wiseite
    (a) BAN ($Al_2O_3.2HNO_3.5H_2O$ or $Al(OH)_2NO_3.2.OH_2O$). or
    (b) Wiseite ($Al_2O_3.2HNO_3.4H_2O$ or $Al(OH)_2NO_3.1.5H_2O$) to precipitate large crystals of BAN; and (4) separating the large crystals.

11 Claims, No Drawings

BASIC ALUMINUM NITRATE CRYSTALLIZATION

FIELD OF THE INVENTION

The present invention relates to a novel method for forming crystals of basic aluminum nitrate (BAN) and more particularly to such a method which yields very large crystals of BAN.

BACKGROUND OF THE INVENTION

The first description of a process for the production of basic aluminum nitrate that might be suitable for incorporation into a nitric acid-based process for the recovery of aluminum oxide from kaolin was by Thor Mejdell in U.S. Pat. No. 1,413,754 and Canadian Pat. No. 224,026. Mejdell's process was improved upon by R. B. Derr and H. P. Stere, U.S. Pat. No. 2,127,504, Aug. 23, 1938. Judging from the paucity of information on this subject since that time, little or nothing has been done either to commercialize or to improve upon the cited developments until the efforts of the instant inventors and their studies which culminated in the inventions to be described herein. From the results of extensive studies we now believe that the cited art has not been commercialized because:

1. The basic aluminum nitrate crystals produced were extremely fine, substantially needles of about 1 micron in diameter by 10 microns long, which are extremely difficult to separate from the mother liquors, and
2. Sustantial quantities of water had to be introduced which diluted the acid and required more heat for evaporation.

Other people have made basic aluminum nitrates for various uses as, for instance, Wolkober, British Pat. No. 1,184,730, published Mar. 18, 1970, who evaporated some nitric acid and water from crystalline aluminum nitrate nonahydrate and then refluxed the residue for 8 hours to obtain a material that was a good additive to polyvinylchloride; Max Buchner, U.S. Pat. No. 1,792,410, who evaporated aluminum nitrate-containing liquors under vacuum to produce an alumina material and thereby of necessity produced a basic aluminum nitrate material; but these and the like failed to address themselves to the problems of (1) using the preparation step to obtain a purification of the crystals as cited by Mejdell and (2) providing the vapors of nitric acid and water at a temperature and pressure satisfactorily for recovering the heat of condensation for reuse at other places in the process. Thus, Wolkober refluxes the material for 8 hours and Buchner does his evaporation under a vacuum.

Mejdell taught the establishment of a pool of aluminum nitrate-containing liquor in a container at atmospheric pressure, or in an autoclave for operation under increased pressure, maintaining the temperature of the pool at between about 140° and 145° C. by the application of heat while simultaneously removing vapors from above the pool and replenishing the liquid in the pool with aluminum nitrate solution and/or steam or water as needed to maintain the temperature of the pool between about 140° and 145° C. An appreciable amount of the alumina precipitated as a crystalline basic aluminum nitrate poor in water. Since the precipitate was crystalline it could be filtered out of the material relatively easily. Further, the concentration of iron in these crystals was substantially less than that in the mothor liquor (we have found the same to be true for potash, phosphorus, and a number of other impurity elements) so that the step can be used as a part of the purification operation required to produce the chemically pure alumina demanded by present-day alumina reduction cells. Mejdell's vapors contained no nitrous gases and, since they were present at one atmosphere pressure or higher, could be condensed at temperatures upward of 100° C. in suitable means whereby the heat of condensation could be recovered and recycled to the process. The crystals were especially suitable as feed to the decomposers where alumina was produced by thermally decomposing the basic aluminum nitrate into alumina, nitrous gases and water vapor, because the crystals did not melt or soften or otherwise become sticky and ball up as was the case when efforts were made to decompose aluminum nitrate nonahydrate in the same types of equipment.

Derr and Stere improved upon Mejdell by introducing a step of first evaporating from the molten aluminum nitrate nonahydrate about 30% of the contained nitric acid and water before feeding the residual strong liquor into the steam-heated pool of Mejdell, and by limiting the total evaporation of nitric acid to about 50% of that contained in the original molten aluminum nitrate nonahydrate in one pass. Basic aluminum nitrate crystals were separated for subsequent calcining and the unprecipitated alumina was recycled. Since the first portion of nitric acid was recovered as about 48% by weight nitric acid solution and the second portion can be about a 35% by weight solution, the overall recovered acid concentration was substantially higher than the 16-20% cited by Mejdell. This represents a very substantial savings in dilution over Mejdell and therefore a very substantial potential savings in energy requirements by Mejdell. Indeed, we have found that the use of the heat of condensation recoverable from the vapors so produced would permit a substantial savings in fuel usage for the manufacture of metallurgical grade alumina from kaolin over other processes producing comparable purity alumina without this step.

However, we have found it exceedingly difficult to realize the potential heat recovery and purification aspects of the production of basic aluminum nitrate because of the very small crystals obtained when making basic aluminum nitrate according to the cited prior art. This has been especially true in attempts to practice the process on a continuous basis such as would be needed for a large alumina-from-clay production facility. Crystals produced have been, predominantly, about 1 micron diameter by 10 microns long with some crystals in the area of, for instance, 5 micron diameter by 30 microns long and a relative few approaching a large size of 15 microns diameter by 45 microns long. We have been able to recover these crystals in laboratory batch type centrifuges lined with fine filter cloth but the capital cost and power consumption of this type equipment for the production of, for example, 10,000 tons/day of crystals is impossible to absorb. Consequently, a principal objective of the instant invention is to produce basic aluminum nitrate crystals of such larger size that they can be separated and washed easily on continuous centrifuges of, for instance, pusher or screen bowl types, as would be required for a commercial operation.

SUMMARY OF THE INVENTION

According to the present invention, large crystals of basic aluminum nitrate (BAN) are prepared from a nitric acid feed solution by a process comprising the steps of:

(1) evaporating water and nitric acid from the solution in a single step evaporation performed at a temperature of between about 270° and about 450° F. at a pressure of between about atmospheric and 60 psig to produce an evaporated liquor comprising at least about 16% alumina by weight;

(2) holding the evaporated liquor in a quiescent state for a period of between about 20 minutes and about 2 hours within the temperature range of about 270° F. to about 350° F.;

(3) injecting water into the product of step 2, the water being added in an amount sufficient to adjust the composition of the conditioned liquor to a composition expressible as the sum of two components
 (1) ANN ($Al_2O_3.6HNO_3.15H_2O$ or $Al(NO_3)_3.9H_2O$), and
 (2) The desired crystal product BAN or Wiseite
  (a) BAN ($Al_2O_3.2HNO_3.5H_2O$ or $Al_2(OH)_2NO_3.2.OH_2O$).
  (b) Wiseite ($Al_2O_3.2HNO_3.4H_2O$ or $Al(OH)_2NO_3.1.5H_2O$).

Mixtures of BAN and Wiseite may be prepared if desired by adjusting the water addition accordingly, and the production of BAN is not impaired by the addition of a relatively small excess of water; and (4) separating the large crystals.

DETAILED DESCRIPTIONS

1. Feed Materials:

Allowable feed materials can vary quite widely in the percentage of alumina and in the molar ratios of nitrate to aluminum. In a practical sense, for the production of alumina from clay, feed generally will comprise crystals of aluminum nitrate nonahydrate, with a small amount of adhering liquor consisting of aluminum nitrate dissolved in water, which upon melting in the temperature range of about 185°–225° F. provides a liquor with usually at least 13% by weight alumina concentration and preferably within the range of about 13.2–13.5% alumina. Concentrations within the preferred range can be obtained by the use of suitable types of centrifuges for de-liquoring the aluminum nitrate nonahydrate crystals.

2. Evaporation:

Feed liquor must be evaporated to its final desired concentration in a single pass through the evaporator. For batch operation this is accomplished by placing the feed material, either liquid or molten, in a closed reaction vessel and evaporating off a desired weight of nitric acid and water vapors at around 300° F. under autogeneous pressure. For continuous operation evaporation is handled in an evaporator, frequently referred to as a long-tube-vertical evaporator, in which the molten feed is pumped into the end of a long titanium or tantalum tube heated on the outside by condensing steam with a condensation temperature within the range of about 350°–450° F. As the liquor is pumped into and through the tube it is first heated to boiling and then evaporates in the tube. The material exits from the opposite end of the tube as a mixture of nitric acid vapor, water vapor, and liquid of the desired alumina concentration at a temperature above about 280° F. and preferably within the range of about 300°–325° F. and at a pressure downstream of the tube exit of from atmospheric to 15 or 20 psig as desired. The pressure may be controlled by a pressure controller on the vapor offtake or preferably downstream of the heat-recovery condenser. The selected pressure has very little effect on the production of basic aluminum nitrate crystals but some pressure above atmospheric is desirable to facilitate recovery of the heat of condensation from the nitric acid and water vapors at usefully high temperature. The liquid temperature, however, should be kept at or above the conditioner temperature, i.e., above about 285° F., preferably within a range of 300°–325° F. The evaporated liquor should contain upwards of about 16% alumina, preferably 18–22% alumina. The higher concentrations favor the growth of larger crystals, however, as the alumina concentration increases, the viscosity of the liquor increases rapidly so that operation of the equipment becomes more difficult at concentrations upwards of about 22% alumina.

3. Conditioning:

For the growth of large crystals it has been found essential to hold the evaporated liquor in a relatively quiesent state for a time of about 20 minutes to 2 hours before inducing crystallization. For batch production this is accomplished by holding the liquor in the evaporator vessel, within the temperature range of about 270° F. to 350° F., preferably 300° F. to 325° F., for the prescribed length of time with or without gentle agitation provided by a stirrer. The liquors are highly supersaturated and unstable and crystallization of undesirably small crystals will occur in the event of excessive mechanical shock from the stirring or from presumably natural causes if the liquor is held for too long a period of time. For continuous operation, using the long-tube-vertical evaporator described above, conditioning must be carried out under plug flow conditions, as in a long pipe with large length to diameter ratio, so that no small puddle of liquid is allowed to remain in the conditioning chamber beyond the alloted conditioning time. In experiments with 18–20% alumina liquors being conditioned essentially in a stagnant pool with feed into and out of said pool we have invariably obtained undesirable fine crystal formation in the pool after about 2 to 2½ hours. It is obvious therefore, and distinct from the prior art, that continuous production of large crystals cannot be obtained simply by providing a feed inlet and an evaporated liquor outlet to an evaporator vessel and feeding through said vessel continuously while removing the requisite amount of vapors from the evaporator. Liquor transfer into and out of the conditioner also must be accomplished by gentle means to avoid mechanical shock. For instance, our efforts to use piston-type pumps have inevitably resulted in the formation of undesirably small crystals.

4. Crystallization (Water Injection):

The conditioned liquor is transferred into a crystallizer unit designed for plug flow of the magma and immediately is treated with a prescribed proportion of water. Said water may be injected either into the liquor stream or just above the liquor stream, as desired, in an amount calculated in known manner from a mass balance to adjust the composition of the conditioned liquor to a composition expressible as the sum of two components
 1. ANN ($Al_2O_3.6HNO_3.15H_2O$ or $Al(NO_3)_3.9H_2O$) and
 2.

(a) BAN ($Al_2O_3 \cdot 2HNO_3 \cdot 5H_2O$ or $Al(OH)_2NO_3 \cdot 2H_2O$), hereinafter referred to as the BAN-ANN Join, if BAN is desired, or (b) Wiseite ($Al_2O_3 \cdot 2HNO_3 \cdot 4H_2O$ or $Al(OH)_2NO_3 \cdot 5H_2O$), hereinafter referred to as the Wiseite-ANN Join, if Wiseite is desired.

Mixtures of BAN and Wiseite may be prepared if desired by adjusting the water addition accordingly and the production of BAN is not impaired by the addition of a relatively small excess of water over that required to form the BAN-ANN Join.

Thus, we prefer to have high levels of super-saturation, that is, high alumina concentration in the evaporated liquor, as it enters the crystallization chamber and temperatures above about 280° F., preferably in the range of about 300° to 325° F. As stated previously, a practical limit is placed on the maximum concentration by handling problems arising from the high viscosities of the liquors. In the crystallizer it is possible also to generate a solids concentration so high that subsequent handling of the magma is difficult. We prefer to keep the solids concentration under about 50% to avoid excessive difficulties in subsequent handling of the magma. Crystals of BAN as large as 200 microns long by 75 to 100 microns wide have been produced. We have not been able to produce Wiseite crystals as large as BAN crystals. However, the Wiseite crystals are of useful size and much larger than either the BAN or Wiseite crystals produced by the old technology. Under the optical microscope both BAN and Wiseite crystals look substantially alike but they are readily distinguished one from the other by their x-ray patterns. It is difficult experimentally to obtain BAN totally free of Wiseite because BAN will convert to Wiseite, with loss of water, when heated in air at temperatures above about 175° F. However, the initial crystal size obtained is not significantly altered by this conversion.

Since BAN and Wiseite dissolve substantially completely in the mother liquor at temperatures above about 400° F. the crystallizer is operated at lower temperatures, preferably below about 350° F. If evaporator operation above 350° F. should be desired the evaporated liquor may be cooled by cooling means designed to provide a first portion of the conditioning period.

5. Separation of Crystals and Washing:

The large crystals of BAN or Wiseite produced in the method described above are readily separated from the residual liquor by various known methods of liquid-solids separation. Since the concentration of most of the trace elements that are undesirable in the final alumina product are much lower in the crystals than in the liquor, a substantially greater purification of the final alumina can be achieved if the adhering mother liquor is washed off. The adhering mother liquor may be removed readily by washing with aluminum nitrate solutions or preferably with water containing about 1 to 5 weight percent nitric acid. Pure water provides a very poor wash because some of the crystals appear to hydrolize to produce a gel-like scum which quickly renders the surface essentially impervious to the ingress of water into the bulk of the cake, preventing effective washing. This film does not form when properly acidified wash solution is used and excellent washing can be obtained. A small portion of the crystals are dissolved during the wash, the amount being somewhat dependent on washing time so that it is desirable to pull or push the wash liquors through the cake rapidly. In the presence of water particularly, large crystals observed under the optical microscope appeared to exfoliate at their ends into the previously described about 1 micron diameter needles and the ends of the large crystals took on the appearance of a broom. As stated by Mejdell and by Derr and Stere, since the washed crystals do not dissolve or melt on heating, they are especially suitable for feed to thermal decomposers wherein they decompose to alumina and to $NO_2$, $O_2$, and water vapor that can be converted easily into nitric acid solution.

6. Mother Liquor Recycle:

The wash liquor produced in (5) and a part if desired of the crystal mother liquor, which carry a substantial portion of the aforesaid undesirable trace elements, may be recycled to an aluminum nitrate nonahydrate crystallization step for further purification and recovery of alumina values for recycle. The remainder of the mother liquor may be recycled to mix with molten aluminum nitrate nonahydrate in the feed tank to the evaporator. The amount of mother liquor, which may contain some BAN crystals that escape the filter, that is recycled for mixing with the molten aluminum nitrate nonahydrate in the evaporator feed tanks should not exceed an amount which may carry sufficient crystals as to cause premature crystallization in the said conditioning chamber. We have obtained satisfactory results after adding some crystals to the molten aluminum nitrate nonahydrate.

Satisfactory results can be obtained (with recycle of mother liquor containing BAN or Wiseite crystals) if the combined alumina concentration of the mixture in the evaporator feed tank, held at about 225° to 375° F., does not exceed about 15%–15½% alumina. However, if a mixture of crystals and mother liquor is heated to about 400°–450° F., 50–60 psig autogenous pressure, dissolved alumina concentrations up to 20% or more can be obtained which, after cooling to around 270° to 325° F. and conditioning, produce very large crystals upon the initiation of crystallization. Small crystals thereby can be converted into large crystals, however, it is economically more favorable to produce the large crystals directly.

EXAMPLE 1

Batch Crystallization

Four kilograms of washed ANN (13.23% $Al_2O_3$, 49.57% $HNO_3$) were heated in a gently stirred, closed autoclave to 150° C. under autogenous pressure. While holding the temperature at about 150° C. vapor was allowed to escape through a needle valve and condensed in a water-cooled condenser—1,410 grams of condensate, which assayed 48.61% $HNO_3$, was collected over a period of 85 minutes and the pressure in the autoclave fell from about 20 to about 8 psig. After stopping the evaporation by closing the needle valve, the autoclave and its contents were held at 150°–155° C. for 141 minutes. With the temperature at 155° C., 162 grams of cool water was injected into the autoclave above the liquor surface in about 2½ minutes. Samples of the magma were withdrawn from the autoclave at intervals after water injection (see table below), the crystals and mother liquor were separated on a filter, the crystals were examined for size and the mother liquor was analyzed so that the yield of BAN crystals at each time period could be calculated from the molar ratio of $NO_3^-$ to Al in the mother liquor. Single crystals as large as 150×240 with mean lengths of around 140 microns, were found in all samples. Some relatively small crystals were observed near the end of the sampling period. Some of the final crystals, after washing with a 3% HNO₃ in water solution, were dried at 110° C. and dryscreened.

| Tyler Screen Size Range | Wt. % Retained |
|---|---|
| +60 Mesh | Trace |
| 60/80 Mesh | 2.60 |
| 80/100 Mesh | 5.49 |
| 100/200 Mesh | 27.75 |
| 200/325 Mesh | 21.10 |
| −325 Mesh | 43.06 |

Mother Liquor Samples

| Minutes After Water Addition | Al₂O₃ (%) | HNO₃ (%) | Molar Ratio NO₃/Al | Calcd. Gms. BAN Precipitated |
|---|---|---|---|---|
| 0 | | | 1.98 | 0 |
| 8 | 14.49 | 45.47 | 2.54 | 600.1 |
| 25 | 14.50 | 48.50 | 2.69 | 693.2 |
| 60 | 14.56 | 48.47 | 2.69 | 693.2 |
| 90 | 14.77 | 48.74 | 2.67 | 681.9 |
| 110 | 14.82 | 48.87 | 2.67 | 681.9 |

Crystallization complete in 25 minutes and nearly complete in 8 minutes.

EXAMPLE 2

Batch Crystallization

Example 1 was repeated except that 100 grams of air-dried BAN crystals were added to the original washed ANN charge. The amounts of evaporation and water injection were modified slightly to yield the same total magma concentration as in Example 1 at the start of crystallization.

1,387.5 grams of condensate, 46.70% HNO₃, were obtained in 84 minutes, the liquor was held for 77 minutes, and 147 grams of cool water was injected with the autoclave at 150° C. Mother liquor analyses gave a calculated total formation of 749.7 grams of BAN crystals at 10 minutes, 761.0 grams at 75 minutes, 744.4 grams at 100 minutes and 636.2 grams at 150 minutes. It is thought that most of the BAN crystals added initially dissolved, but a sample of the evaporated liquor obtained just before the water addition was a little cloudy, i.e., not as clear as in Example 1. Large crystals were obtained, typically 140 microns long, in the 10 minute sample and all subsequent samples.

EXAMPLE 3

Summary of Batch Tests

A large number of batch crystallizations were made with the experimental techniques described in Example 1 but with various evaporated liquor concentrations, hold times and crystallization temperatures. Injected water quantities were calculated for each run to achieve a concentration of the mixed liquor. The results indicated that large crystal formation was favored by evaporated liquor concentrations above about 18% Al₂O₃, longer holding times, and crystallization temperatures of 150°–155° C. instead of 138° to 145° C. A maximum desirable crystallization temperature was not determined; however, we have been able to dissolve large amounts of BAN in mother liquor around 220° C. and so would not expect to be able to operate near that temperature. Further, evaporation at 150°–155° C. can be accomplished with easily available 100–200 psig steam, and the pressures and condensation temperatures obtained for the evaporator vapors are adequate for use of the heat of condensation in the evaporation of aluminum nitrate liquors for the crystallization of aluminum nitrate nonahydrate used as feed to the BAN crystallization area.

Samples of the evaporated liquor were inspected just before water addition. In all cases in which crystallization had already begun the crystals obtained after the water addition had been made were undesirably small, mostly 1×10 microns.

CONTINUOUS CRYSTALLIZATION

EXAMPLE 4

Process According to Prior Art

A pilot plant unit comprised a first evaporator that supplied feed of controlled composition to a second, recirculating evaporator which supplied feed to a crystallizer vessel and could receive overflow liquor from the crystallizer. These units were operated over period of about six months under various conditions, especially in the said second evaporator and crystallizer, of feed composition, boiling temperature and pressure, water injection, residence time, and concentrations within the range of the BAN-ANN and Wiseite-ANN Joins and on the water-rich side of the BAN-ANN Join. Although a few crystals up to a size about 15×45 microns usually were present, most of the BAN solids consisted of crystals of 10 microns or less long by ½ to 1 m diameter. Many crystals were so small they were difficult to see with the optical microscope. Screen analyses of representative samples taken on five different days of a continuous run that produced crystals as large or larger than any of the others made during the pilot plant study are tabulated below.

| Screen Analyses - Weight % Retained on Screen | | | | | |
|---|---|---|---|---|---|
| Tyler Mesh Date: | 11/14 | 11/16 | 11/17 | 11/18 | 11/19 |
| +40 | 0 | 0 | 0 | 0 | 0 |
| 40/70 | 0 | Tr | Tr | Tr | Tr |
| 70/100 | 0.8 | Tr | Tr | Tr | 1.0 |
| 100/200 | 4.4 | 1.8 | 2.0 | 1.3 | 5.8 |
| 200/325 | 10.6 | 4.8 | 6.8 | 3.3 | 15.5 |
| −325 | 84.1 | 93.4 | 91.7 | 95.4 | 77.7 |

Tr = Visible, not enough to weigh

Conditions of this run were similar to those described by Mejdell for continuous operation. Feed composition to the said second evaporator was adjusted to maintain the magma at total compositions (crystals plus mother liquor) along the BAN-ANN Join where it has an atmospheric pressure boiling temperature of around 140° C. Pressurization of the evaporator also permitted operation with magma temperatures up to about 155° C. Overflow magma from the evaporator was held in the crystallizer for various residence times in the hope that crystals might continue to grow and/or that larger crystals might be separated from the fines by elutriation but no beneficial effects were detected.

Earlier in the six months pilot plant campaign a considerable effort was made to obtain a clear, concentrated liquor in the second evaporator that could be fed to the crystallizer and injected with water to induce crystallization. Clear liquors at concentrations up to 15½–16% Al₂O₃ were obtained but the crystals obtained therefrom were the 10 micron and down sizes. Whenever the liquor concentration in the evaporator exceeded the 15½–16% $Al_2O_3$ range rapid formation of the said small crystals occurred and the mix of liquor and small crystals took on the appearance of milk. It was concluded after much effort that attainment of the 18 to 22% $Al_2O_3$ clear liquor concentrations found desirable in early batch tests was impossible with the recirculating evaporator.

EXAMPLES ON CONTINUOUS OPERATION ACCORDING TO INVENTION

Bench scale equipment was used in Examples 5 through 8. According to the standardized equipment and techniques used in these examples, aluminum nitrate feed materials, melted and kept molten in a steam-heated feed barrel were pumped at a pre-selected rate by a piston metering pump to the tube side of a single-tube-in-shell steam-heated long tube vertical (LTV) evaporator inclined at an angle of about 45° from the vertical in order to fit the available head-room. The evaporator consisted of two approximately 17-foot heated lengths of 0.25 inch O.D. Ti tubing (0.028-inch wall) in series in shells of 2-inch iron pipe. Each of the two shell sections had steam supply means at its top and condensate removal means at its lower end. The Ti tube was connected through a pressure-smoothing chamber to a metering pump at the lowest end, the two sections of tube were joined together at the center, and the top end of the tube extended about 18 inches into a 3-inch I.D.×4 ft. long Pyrex glass pipe. All areas exposed to either steam or process material were isolated from each other and from the atmosphere by suitable pressure-tight fittings, flanges, etc. The Pyrex glass pipe, flanged at each end, was fitted at the top with a pressure gauge and a vapor exhaust pipe connected through a hand-operated ball valve to a water-cooled condenser; and at the bottom with a liquor drain pipe connected to the crystallizer.

During operation of the evaporator liquor from a feed tank was pumped through the pressure-smoothing chamber into the heated Ti tube. As the liquor flowed through the heated tube it was first heated to boiling and then partially evaporated and the resulting mixture of vapors and liquor was expelled as a jet from the upper end of the tube, in the glass pipe, that impinged on a splash plate that served to separate the liquor from the vapor and also contained a thermocouple whereby the temperature of the vapor could be determined. The vapors rose in the Pyrex pipe and passed through a vapor line and valve and were condensed in a condenser to nitric acid solution which drained into a suitable receiver. The valve could be partially closed as desired to restrict the flow of vapor and thereby create super-atmospheric pressure in the Pyrex pipe disengagement chamber.

Evaporated liquor drained through a pipe to a 3-way valve which could be set as desired to stop the flow, divert the liquor to a waste receiver, or permit it to flow through a metering dump valve to the crystallizer which was also fitted in the top flange with a water-injection tube, a pressure gauge, and a thermocouple that extended well into the crystallizer tube in a suitable thermowell. The crystallizer consisted of a Pyrex 3 inch×1 inch bell section, capped with a fluorocarbon (Teflon) gasketed S.S. 304 flange to hold the aforedescribed fittings and connected on the other end by a standard ground fitting to a vertical 8-foot length of 1-inch I.D. Pyrex pipe to the bottom of which, in series, was appended through suitable flanging and pipe connectors a Strahman sampling valve and a second metering dump valve that passed magma to a suitable collector.

All external surfaces of the above-described equipment were suitably insulated to minimize heat loss, and process liquor lines and the crystallizer also were heat-traced with steam tubing to minimize temperature changes. The metering dump valve comprised a rotatable ball valve with a solid ball in which a cup had been drilled. As the ball was rotated by a variable-speed rotating means the cup would alternately fill with liquid or magma as it faced upward and drain as it faced downward. This device appeared to be sufficiently free of mechanical shock that it did not induce premature crystallization in the liquor.

Water was supplied to the water injection tube from the drinking-water supply through a rate-measuring means at rates regulated by a hand-operated needle valve. During operation the injected water drained down onto the surface of the liquid in the crystallizer and some boiling occurred. In order to minimize this boiling, which appeared to increase the proportion of fines in the crystal product, it was necessary to operate this specific crystallizer at around 141° C. instead of the 150°–155° C. found to be better in the batch tests (Examples 1–3). In a revised design with a substantially vertical plug-flow conditioning section the pressure head at the water injection location would be increased substantially and therefore it would be possible to operate the crystallizer at more favorable temperatures without excessive boiling.

Conditioning of the evaporated liquor was accomplished in a pool of liquid built up in the LTV vapor head. Since this was not a plug-flow pool its useful life during a run was determined by its stable period, i.e., the length of time from the start of pool formation to the onset of crystallization in the pool.

EXAMPLE 5

An average feed rate of 19.6 lbs. per hour of molten aluminum nitrate (13.22% $Al_2O_3$, 49.45% $HNO_3$) was maintained by the pump to the evaporator and a pressure of around 10 psig was maintained in the vapor head, 5.5 lbs. per hour of condensate that assayed 50.50% $HNO_3$ was collected in the receiver leaving by material balance calculation, 14.1 lbs. per hour of evaporated liquor containing 18.34% $Al_2O_3$, 49.04% $HNO_3$ as feed to the crystallizer. The splash plate temperature was 157° C. and the crystallizer temperature varied about 5° C. above and below 141° C. Manual control of the injection water rate was difficult, however a grab-sample of magma taken during the run assayed 17.84% $Al_2O_3$, 47.70% $HNO_3$.

The run was maintained for about 3 hours at satisfactorily steady conditions. Evaporated liquor was draining freely from the splash plate down the bottom of the Pyrex pipe into the outlet pipe with no liquid hold-up pool in the pipe. It is not known whether or not any liquid hold-up region existed between the entry to the outlet pipe and the metering valve; however, the viscous liquid flowed at a relatively slow rate, compared to water, so that the transfer was not instantaneous. BAN crystal sizes in magma samples taken through the sampling valve were checked periodically with an optical microscope. The crystals obtained were essentially all needles 10 microns or less in length, and seemed to get smaller as time progressed.

After about 3 hours, a partial malfunction of the metering dump valve forced a reduction in the rate of flow of liquor into the crystallizer and a pool of liquid began to form slowly in the LTV vapor head. Operation was continued as the pool increased in size. About 1½ hours after the pool formation began a large number of large crystals were observed in a sample. No further useful data was obtained during this run.

EXAMPLE 6

This run was made to test the conditions that apparently produced the favorable BAN particle sizes observed in Example 5. Feed rate and evaporator conditions were set while discharging the evaporated liquor to waste through the three-way valve. Then the valve was closed to retain the evaporated liquor in the LTV vapor head and a pool of liquor was allowed to accumulate for about 35 minutes, at which time the top of the pool was an inch or so below the end of the said titanium evaporator tube from which the vapor-liquid jet issued to impinge on the splash plate. This level of the top of the pool was marked and thereafter maintained reasonably constant by manual adjustment of the rate of liquor flow to the crystallizer.

After the said conditioning pool was established the 3-way valve was opened to permit liquor flow to the metering dump valve and thence to the crystallizer.

After about ½ hour, when the crystallizer was substantially full, water injection was begun at a rate estimated to provide a final slurry composition on the BAN-ANN Join. A sample of slurry taken near the end of the run, after large crystals had been present in the slurry for some time, assayed 18.84% Al$_2$O$_3$, 47.78% HNO$_3$, a composition that is close to but slightly on the water-deficient side of the BAN-ANN Join.

Large crystals were observed in samples taken around 30 minutes after the start of water injection. A magma sample was obtained, just at shut down, and solids were separated therefrom and washed with a 3% nitric acid solution in water on a small laboratory centrifuge. The washed crystals were oven-dried and sieved through a set of Tyler mesh screens. Subsequent optical examination of the screen fractions revealed that the wash had been poor and the fractions consisted mostly of agglomerates. It was estimated from the visible crystals that the mean crystal length was at least 40 microns.

EXAMPLE 7

A run was made substantially as in Example 6. The conditioning pool mean residence time was about 30 minutes and tiny crystals began forming in the pool 153 minutes after the start of liquor holdup. A sample of magma obtained after the appearance of large crystals assayed 16.59% Al$_2$O$_3$, 43.68% HNO$_3$, a composition substantially on the water-rich side of the BAN-ANN Join. Washed and dried crystals were sieved with the following results.

| Tyler Mesh Range | Wt. % of Fractions | Optical Examination |
|---|---|---|
| 60/80 | 2.9 | All Agglomerates |
| 80/100 | 1.7 | All Agglomerates |
| 100/200 | 11.6 | Over ½ Single Crystals |
| 200/325 | 28.5 | Very Few Agglomerates - Crystal Length Range 45 To 90 Microns |
| −325 | 55.2 | All Crystals |

The mean crystal size was estimated to be at least 45 microns.

EXAMPLE 8

Operation was as in Example 6 and 7. Mean residence time in the conditioning pool was about 30 minutes and small crystals appeared in the pool 135 minutes after the start of pool formation. The run was terminated after the start of crystallization in the conditioning pool since it had already been observed that the presence of these very small crystals greatly inhibited the formation of the desired large crystals. As in Example 7 the magma composition was on the water-rich side of the BAN-ANN Join. Sieve analyses of the washed and dried products were as follows.

| Tyler Mesh Range | Wt. % of Fractions | Optical Examination |
|---|---|---|
| 60/80 | 12.9 | All Agglomerates |
| 80/100 | 7.3 | 10–25% Single Crystals, Upwards of 150 Microns |
| 100/200 | 30.7 | Major Portion 75 to 100 Microns. Range About 45 to 150 Microns Length |
| 200/325 | 23.9 | Major Portion About 90 Microns. Range From Below 45 to 135 Microns |
| −325 | 25.2 | Major Portion 45+ Microns. Small Amount Less Than 25 Microns, Some 90 microns |

Estimated mean size about 75 microns, after eliminating agglomerates.

According to the presently-preferred embodiment of the invention, molten ANN material from a supply tank is pumped at a constant rate selected to maintain ½ to 2 hour residence time in the liquor conditioner means, to a long-tube-vertical type evaporator wherein it is partially evaporated to produce a mixture of liquid and vapor entering vapor separator means comprising a liquor concentration of between 18 and 22% alumina. The vapor is separated from the liquor and conducted to a steam generator to produce low pressure steam which is passed through suitable conductance means to be used in heating or evaporating process liquors. Nitric acid vapors are bled through a pressure sensor in the vapor head which supplies a signal proportional to the pressure to a signal-responsive flow control valve downstream of the steam generator whereby a relatively constant pressure is maintained in the vapor head and in the steam generator. The condensed nitric acid is recycled to other areas of the total process. The liquor is separated from the vapor in the vapor head and drains by gravity through a liquor conditioner, which comprises a suitable thermally-insulated pipe of large length to diameter ratio to achieve plug flow conditions, and preferably through a vapor trap into a crystallizer which comprises thermally insulated pipe sized to provide a residence time of about 10 to 30 minutes. A flow of water is injected at a controlled rate to induce crystallization. The crystal magma drains through a flow control means, which is responsive to a signal from a liquid level sensor, to a suitable washing centrifuge in which the basic aluminum nitrate crystals are separated from the mother liquor and washed, to remove adhering mother liquor, with a quantity of 1 to 3% nitric acid solution.

The evaporator comprises 1 or more titanium evaporator tubes of a number, diameter and length selected in accordance with well known design principals for this type of evaporator. The evaporator preferably is heated by condensing steam which as is well known can provide a film heat transfer coefficient on the steam side of 1,000 to 2,000 btu per hour per square foot-degree F, whereby the length of the said evaporator tubes required to provide adequate heat transfer into the liquor is minimized. The liquor-vapor separator used with this type evaporator usually comprises a simple splash plate to intercept the liquid-vapor mixtures jetting from the tubes, and, in this particular instance, the liquid drain at the base of the vapor head is suitably shaped and positioned so that liquor drains cleanly into the liquor conditioner without forming any pockets of relatively stagnant liquor wherein premature crystallization of overaged liquor could begin. To further facilitate proper drainage the vapor header is preferably inclined somewhat from the horizontal and the combination evaporator-vapor header may if desired be vertical as is common in industrial installations. Autogenous pressures of around 5 to 20 psig have been observed in conjunction with the injection of water into the conditioned liquor. To prevent the possible back-flow of water vapor into the liquor conditioner, therefore, in addition to the provision of a vapor trap we provide a pressure head on the conditioned liquor at the point of entrance into the crystallizer of at least about 15 psig, developed and maintained in combination, by the static head of liquor in the conditioner and the operating pressure in the vapor header controlled as aforesaid.

The flow control means at the base of the crystallizer preferably comprises means similar to the aforedescribed rotary dump valve or, for instance, a star valve or the like which are commonly employed for the control of streams containing large quantities of relatively fragile solids, whereby the breakage of crystals, which for instance might occur with many types of centrifugal pump means, is minimized.

What is claimed is:

1. A process for preparing large crystals of basic aluminum nitrate from a nitric acid feed solution containing $Al_2O_3$ comprising the steps of:
   (a) evaporating water and nitric acid from the feed solution in a single step evaporation performed at a temperature of between about 270° and about 450° F. and at a pressure of between about atmospheric and about 60 psig to produce an evaporated liquor comprising at least about 16% alumina by weight;
   (b) holding the evaporated liquor in a quiescent state for a period of between about 20 minutes and about two hours at a temperature of between about 270° F. and about 350° F.;
   (c) injecting water into the product of step b to induce crystallization, the water being added in an amount sufficient to adjust the composition of the conditioned liquor to a composition expressible as the sum of two components
      (1) Aluminum nitrate nonahydrate, and
      (2) the selected crystal product of hydrated basic aluminum nitrate; and
   (d) separating the large crystals.
2. The process of claim 1 wherein the feed solution comprises at least about 13% by weight alumina.
3. The process of claim 2 wherein the feed solution comprises from about 13.2 to about 13.5% by weight alumina.
4. The process of claim 1 wherein said evaporation is performed at a temperature above about 280° F.
5. The process of claim 4 wherein said evaporation is performed at a temperature between 300° and about 325° F.
6. The process of claim 1 wherein the evaporated liquid comprises between about 18 and 22% by weight of alumina.
7. The process of claim 1 wherein the solids concentration in the evaporated liquid of step c is less than about 50 percent.
8. The process of claim 1 including the additional step wherein the large crystals of step d are washed with an acidic solution whereby the proportion of adhering liquor comprising dissolved impurity elements is reduced.
9. The process of claim 8 wherein the said acidic solution comprises about 1% to 5% nitric acid dissolved in water.
10. The process of claim 8 wherein the said acidic solution comprises aluminum nitrate.
11. The process of claim 1 including the additional step wherein the evaporated vapors of step a are condensed in heat recovery means whereby the heat of condensation is recovered for beneficial use.

* * * * *